No. 726,979. PATENTED MAY 5, 1903.
M. O'MARRA.
CALENDAR.
APPLICATION FILED SEPT. 18, 1902.
NO MODEL.
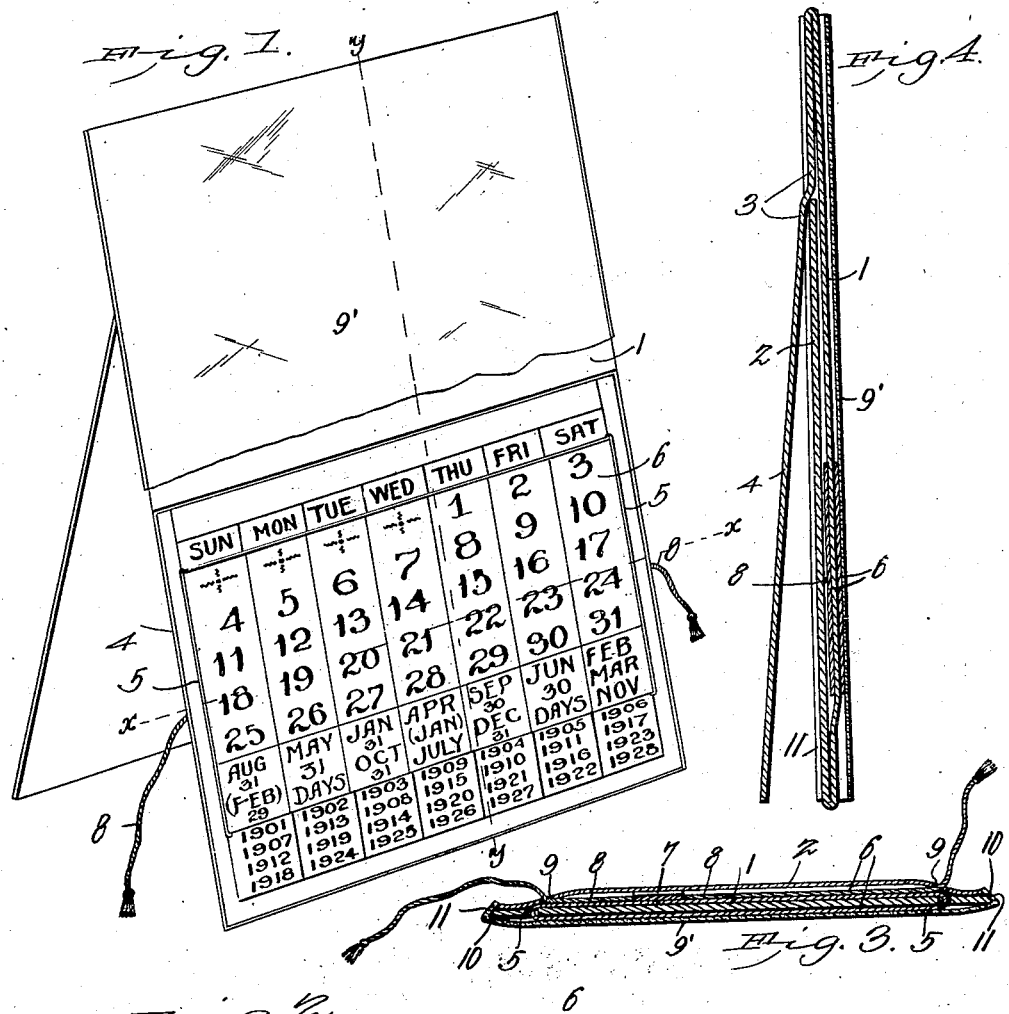

No. 726,979. Patented May 5, 1903.

UNITED STATES PATENT OFFICE.

MARTIN O'MARRA, OF KINGSTON, NEW YORK.

CALENDAR.

SPECIFICATION forming part of Letters Patent No. 726,979, dated May 5, 1903.

Application filed September 18, 1902. Serial No. 123,915. (No model.)

*To all whom it may concern:*

Be it known that I, MARTIN O'MARRA, a citizen of the United States, residing at Kingston, in the county of Ulster and State of New York, have invented a new and useful Calendar, of which the following is a specification.

This invention relates to that class of calendars which are usually known as "perpetual" and in which provision is made for the relative adjustment of parts, so as to make the calendar useful and available for an indefinite series of years; and my present object is to provide a device of this class which while simple in construction and inexpensive shall be neat and attractive in appearance and in which the exposed parts shall be protected by a transparent cover, so as to be unaffected by dust and the like.

My invention consists in the improved construction, arrangement, and combination of parts having for its object to provide a device of the class referred to which shall possess superior advantages in point of simplicity, durability, and general efficiency, as will be hereinafter fully described, and particularly pointed out in the claims.

In the drawings, Figure 1 is a perspective view of a perpetual calendar embodying my improvements, a portion of the transparent protective covering having been broken away. Fig. 2 is a plan view showing the slide or band removed from the calendar and with its ends disconnected so as to expose the entire series or figures or characters thereon. Fig. 3 is a horizontal sectional view taken on the line *x x* in Fig. 1. Fig. 4 is a vertical sectional view taken on the line *y y* in Fig. 1.

Corresponding parts in the several figures are indicated by like characters of reference.

My improved calendar or the body or frame of the same is constructed mainly of cardboard and is composed, essentially, of the facing 1, the backing 2, which is secured to the rear side of the facing and which extends from the bottom of said facing to a point, say, within one inch from the upper edge of the same, and the supporting-piece 3, which is secured to the rear side of the facing 1 above the upper edge of the backing 2, which latter lies between the said facing and the folding flap 4 of the supporting-piece. The facing 1 is provided with vertical slits 5 5 to accommodate the sliding band 6, the ends of which are connected behind the facing, in front of which one-half of the said sliding band is constantly exposed. At the connecting part of the ends of the sliding band behind the facing is mounted a brace or stiffener 7, which may be of cardboard or other suitable material and to which is suitably attached an operating-cord 8, the ends of which project through openings 9 9 in the backing 2, so as to be readily grasped by the operator. It will be seen that by means of this cord the band 6 may be slid or adjusted with relation to the facing 1, so as to expose in front of the said facing any portion of the said band except its connected ends and the parts closely contiguous thereto.

Upon the front side of the facing 1, in a horizontal row across the same and directly above the exposed upper edge of the band 6, is imprinted the names of the days of the week or abbreviations of the same, as plainly shown in Fig. 1. Below the lower edge of the exposed portion of the band 6 are imprinted the numbers of the years, suitably arranged with relation to each other and arranged in seven columns below the days of the week. Directions for setting or operating the calendar may also be printed upon the facing 1. Upon the face of the sliding band 6 are printed the numbers of the days of the month, the same being arranged in the manner clearly shown in Fig. 2 of the drawings, by reference to which it will be seen that the said figures or characters read from left to right and have been arranged in thirteen columns, so as to afford a surplus sufficient to provide for the proper adjustment of said characters with relation to the days of the week imprinted upon the facing 1. The names of the different months have also been arranged in the columns below the numerals in such a manner as to be capable of being brought into suitable registration with the numbers of the years imprinted upon the facing.

In order to protect the facing of the calendar and the sliding band from injury or from being soiled by dust and the like, I have provided a protective covering for the same. This, which is denoted by 9', I prefer to construct of a sheet of celluloid, which has the several advantages of being transparent, waterproof, and capable of being readily formed into such a shape as to be conveniently connected with the facing. The protective sheet or covering 9' may be connected with the body of the calendar in various ways, but the preferred construction is that which will be clearly seen by reference to Fig. 3 of the drawings. By referring to said figure it will be seen that the rear side of the edges of the body of the calendar, the same being constituted by the facing 1, the backing 2, and as much of the supporting-piece 3 as lies above the said backing, is beveled, as shown at 10 10, so as to be readily engaged by the inturned edges 11 of the protective sheet 9'. Celluloid, of which the latter, as stated, is preferably made, may be readily bent to the desired shape and will also retain the shape to which it is formed with sufficient constancy. A sheet of celluloid thus bent or formed may readily be slid into position upon the face of the calendar, where it is retained by the inturned edges 11 with sufficient security to prevent its being accidentally displaced. At the same time I entirely avoid the use of auxiliary fastening devices, which would be disfiguring as well as expensive. There will be no sharp or projecting corners, and the entire appearance of the device will be smooth, neat, and ornamental.

The upper portion of the facing 1 of my improved calendar may be reserved for advertising purposes, and it will be readily understood that the inexpensiveness, neatness, and general attractiveness of this device make it especially desirable and useful as an advertising medium.

By combining the body of the calendar constructed as herein described with the transparent covering-sheet, composed of a sheet of celluloid, constructed and applied as herein described, with its inturned or bent edges engaging the beveled edges of the calendar-body, the said beveled edges are also well protected, a feature which is especially important when the calendar-body, as in this case, is composed of several plies or layers of material. The protective covering is likewise of importance in preventing injury to the exposed edges of the adjustable sliding band of the calendar.

Having thus described my invention, I claim and desire to secure by Letters Patent of the United States—

1. In a device of the class described, the combination of the facing, the backing secured thereto and terminating at a distance from the upper edge of the facing and a supporting-piece secured to the rear side of the facing, between the upper edge of the backing and the upper edge of the facing and having a flap folding upon the backing.

2. In a device of the class described, the combination of a facing, the backing secured thereto, the supporting-piece secured to the facing above the backing and having a flap folding upon the latter, a band mounted to slide in vertical slits in the facing, and an operating-cord attached to said band and having its ends extended through perforations in the backing, substantially as set forth.

3. In a device of the class described, the combination of a facing having vertical slits formed therein, a band mounted slidingly in said slits and having its ends connected behind the facing, a backing secured upon the rear side of the latter, and an operating-cord connected with the connected ends of the sliding band and having its ends extended through openings in the backing, substantially as set forth.

4. In a device of the class described, the body comprising the facing, the backing, and a supporting-piece secured to said facing above said backing, the said body having its edges beveled as described, in combination with a protective sheet or covering having inturned edges, substantially as set forth.

5. The combination with a body, composed of several layers of material and having beveled edges, of a flexible transparent protective cover having permanently-inturned edges engaging slidingly with the beveled edges of said body, substantially as set forth.

6. In a device of the class described, the combination of a facing having slits therein, a band mounted slidingly in said slits, a backing secured to the rear side of said facing and disposed to cover the said sliding band, and a protective sheet or cover mounted in front of the facing and having its edges inturned to engage the edges of the facing and backing, substantially as set forth.

7. In a device of the class described, the combination of the facing having slits therein, a band mounted slidingly in said slits, a backing secured to the rear side of the facing and disposed to cover the sliding band, a supporting-piece having connection with the rear side of the facing above the backing, and a protective sheet or cover mounted in front of the facing and having its edges inturned to engage the edges of the facing, the backing, and that portion of the supporting-piece which is secured to the facing above the backing, substantially as set forth.

8. In a device of the class described, the combination of the facing having slits therein, a band mounted slidingly in said slits and having its ends connected behind the facing, a backing secured to the latter and disposed to cover the sliding band, a stiffener secured to the connected ends of the latter, an operating-cord attached thereto and extended through openings in the backing, and a protective transparent sheet mounted in front of the facing and having inturned edges engaging the edges of the facing and backing, substantially as set forth.

9. In a device of the class described, the combination of the facing having slits therein and provided on its one side with printed characters denoting the days of the week and the numbers of years, suitably arranged, with a band mounted slidingly in the slits of the said casing and having numbers for the days of the month, and the names of the months imprinted thereon, suitably arranged in vertical columns with surplusage to provide for the adjustment of the band with relation to the facing, backing secured to the rear side of said facing, an operating-cord connected with the sliding band and openings in the backing, near the edges thereof, through which the ends of the said operating-cord extend, substantially as set forth.

In testimony that I claim the foregoing as my own I have hereto affixed my signature in the presence of two witnesses.

MARTIN O'MARRA.

Witnesses:
JOHN T. CAHILL,
JOHN L. O'MARRA.